United States Patent [19]

Flamm et al.

[11] Patent Number: 5,738,295
[45] Date of Patent: Apr. 14, 1998

[54] PROCESS AND APPARATUS FOR TENSIONING A TRAVELING THREAD IN A TEXTILE MACHINE BY MEANS OF A COMB TENSIONER

[75] Inventors: Franz-Josef Flamm, Stolberg; Christian Sturm, Krefeld, both of Germany

[73] Assignee: W. Schlafhorst AG & Co., Moenchengladbach, Germany

[21] Appl. No.: 748,129

[22] Filed: Nov. 12, 1996

[30] Foreign Application Priority Data

Nov. 28, 1995 [DE] Germany ............ 195 44 202.4

[51] Int. Cl.⁶ .......................................... B65H 77/00
[52] U.S. Cl. ........................ 242/419.1; 242/419.7; 242/154
[58] Field of Search ............... 242/419.1, 419.3, 242/419.7, 147 M, 153, 154

[56] References Cited

U.S. PATENT DOCUMENTS

| | | | |
|---|---|---|---|
| 2,402,739 | 6/1946 | Doughty | 242/419.7 X |
| 2,635,821 | 4/1953 | Shontz | 242/419.7 X |
| 2,732,142 | 1/1956 | Grein | 242/419.7 X |
| 2,956,756 | 10/1960 | Halkyard | 242/419.7 X |
| 3,231,216 | 1/1966 | Lemarchand | 242/150 |
| 3,300,161 | 1/1967 | Hermanns | 242/154 |
| 3,966,133 | 6/1976 | Gelin | 242/419.7 X |
| 5,499,772 | 3/1996 | Maeda et al. | 242/35.5 R |

FOREIGN PATENT DOCUMENTS

| | | | |
|---|---|---|---|
| 0 531 753 A1 | 8/1992 | European Pat. Off. | |
| 533597 | 3/1993 | European Pat. Off. | 242/419.7 |
| 574 062 A1 | 12/1993 | European Pat. Off. | |
| 89 00 167.2 | 6/1990 | Germany . | |
| 4027275 | 3/1992 | Germany | 242/419.7 |
| 37 34 471 C2 | 5/1992 | Germany . | |
| 41 29 803 A1 | 3/1993 | Germany . | |
| 41 30 301 A1 | 3/1993 | Germany . | |
| 4129803 | 3/1993 | Germany | 242/419.1 |

| | | |
|---|---|---|
| 43 35 089 A1 | 4/1994 | Germany . |

OTHER PUBLICATIONS

W. Wegener et al, "Die Beeinflussung der relativ langzeitigen Fadenzugkraft–Unterschiede durch Fadenbremsen", Textilindustrie 70, Aug. 1968, pp. 537–543.

W. Wegener et al, "Die Beeinflussung der relativ langzeitigen Fadenzugkraft–Unterschiede durch Fadenbremsen", Textilindustrie 70, Oct. 1968, pp. 691–698.

W. Wegener et al, "Die Beeinflussung der relativ langzeitigen Fadenzugkraft–Unterschiede durch Fadenbremsen", Textilindustrie 70, Nov. 1968, pp. pp. 800–808.

W. Wegener et al, "Die Beeinflussung der relativ langzeitigen Fadenzugkraft–Unterschiede durch Fadenbremsen", Textilindustrie 70, Dec. 1968, pp. 893–897.

W. Wegener et al, "Die Beeinflussung der relativ langzeitigen Fadenzugkraft–Unterschiede durch Fadenbremsen", Textilindustrie 71, Jan. 1969, pp. 24–30.

W. Wegener et al, "Die Beeinflussung der relativ langzeitigen Fadenzugkraft–Unterschiede durch Fadenbremsen", Textilindustrie 71, Jan. 1969, pp. 95–102.

W. Wegener et al, "Eine Kompensationsgitterbremse für den mit hoher Geschwindigkeit erfolgenden Abzug der Fäden von Streckcops", Textileindustrie 71, Mar. 1969, pp. 178–183.

*Primary Examiner*—Daniel P. Stodola
*Assistant Examiner*—Tina R. Taylor
*Attorney, Agent, or Firm*—Kennedy Covington Lobdell & Hickman LLP

[57] ABSTRACT

In order to regulate the thread tension force of a traveling thread to a predeterminable set value, a comb tensioner with stationary thread guide elements and displaceable thread guide elements is provided, wherein the displaceable thread guide elements can be displaced by means of an electrodynamic drive mechanism which has a current-force-proportional characteristic curve and whose current supply is changed by a thread tension force regulating device, whereby the comb tensioner is employed both in a function as a thread tension force sensor and in a function as a thread tensioner.

6 Claims, 3 Drawing Sheets

PROCESS AND APPARATUS FOR TENSIONING A TRAVELING THREAD IN A TEXTILE MACHINE BY MEANS OF A COMB TENSIONER

FIELD OF THE INVENTION

The present invention relates to a process and apparatus for tensioning a traveling thread in a textile machine by means of a comb tensioner containing thread guide elements which are stationary and thread guide elements which are displaceable in respect to the stationary guide elements in a defined manner by means of an electric drive mechanism.

BACKGROUND OF THE INVENTION

It is known (e.g., German Patent Publication DE 37 34 471 C2) to control the thread tension force between a feed spool and a take-up spool of an automatic winding frame by means of a comb tensioner such that the tensioning force or the increase in the thread tension force exerted by the comb tensioner is decreased when the rotational speed (rpm) of the take-up spool has reached a predetermined value. To this end, it is known to adjust the displaceable thread guide elements of the comb tensioner by means of an electric motor.

The theoretical basis for calculating and designing comb tensioners is known from a publication of W. Wegener and G. Schubert entitled "Die Beeinflussung der relativ langzeitigen Fadenzugkraft-Unterschiede durch Fadenbremsen" [Affecting the Relatively Long-Term Differences in Thread Tension Forces by Means of Thread Tensioning Devices], printed in TEXTILINDUSTRIE 1968, pp. 537–543, 691–698, 800–808, 893–897, and 1969, pp. 24–30 and 95–102.

Thread tensioners with two tensioning plates pressed against each other are also known (e.g., German Patent Publication DE 41 30 301 A1), wherein one of the tensioning plates is acted upon by a loading device consisting of a moving coil and a solenoid. With this design, the thread tensioning force is adjusted to a set value by means of a regulator which processes the actual values measured by means of a thread tension force sensor together with pre-set values.

A thread tension force sensor is also known (e.g., German Patent Publication DE 41 29 803 A1) which is particularly suited for fast-traveling thread. This known thread tension force sensor contains a guide element, which is maintained in a position to deflect the traveling thread by means of a moving coil-solenoid drive mechanism and a position regulating circuit. The amount of current which is respectively needed to maintain the thread guide element in its position is proportional to the thread tensioning force, so that the thread tensioning force can be registered in this way.

OBJECT AND SUMMARY OF THE INVENTION

It is an object of the present invention to provide a process and apparatus for tensioning a traveling thread in a textile machine by means of a comb tensioner, whereby the thread tensioning force can be adjusted to a set value.

This object is attained in the present invention by adjusting the displaceable thread guide elements by means of an electrodynamic drive mechanism whose output drive force is proportional to the input electrical current, and wherein the current supply is changed in order to adjust a thread tension force existing downstream of the comb tensioner to a set value. The actual values of the thread tension force are determined as a function of reactive forces of the displaceable thread guide elements of the comb tensioner acting on the electrodynamic drive mechanism and their position. The actual values of the thread tension force are compared with the set values for the thread tension force, and in case of deviations between the actual value and the set value of the thread tension force, adjusting signals are transmitted to appropriately change the amount of current supplied to the drive mechanism.

The process in accordance with the present invention provides the advantage that a thread tension force adjustment is realized by utilizing the comb tensioner to perform both a tensioning function as well as a function as a thread tension force sensor.

In a first embodiment of the invention, a thread tension force regulating circuit is superimposed on a position regulating circuit, which maintains the displaceable thread guide elements at position set values predetermined by the thread tension force regulating circuit by means of adjusting signals which change the amount of current supplied to the drive mechanism. The actual values of the thread tension force are obtained from the signals of the position regulating circuit and the position sensor. The position regulating circuit maintains the displaceable thread guide elements at the predetermined set position, even if changes in the thread tension force occur. In this case, the position regulating circuit forms an adjusting signal for changing the amount of current supplied to the electrodynamic drive mechanism in such a way that the thread guide elements immediately take up the set position again. The signal which corresponds to the amount of current supplied to the electrodynamic drive mechanism, by means of which the thread guide elements are returned to their set position, is proportional to the actual value of the thread tension force, so that this signal can be evaluated in the thread tension force circuit in order to make a comparison of the actual value and the set value of the thread tension force. In case of deviations between the actual value and the set value, a signal is formed in the thread tension regulating circuit to provide the position regulating circuit with a new set value for the position, which takes the change in the thread tension force into consideration and in this way allows an adjustment to the set value of the thread tension force.

In another embodiment of the invention, a signal representing the value of the amount of current supplied to the electrodynamic drive mechanism and a signal representing the position of the displaceable thread guide elements of the comb tensioner are evaluated to form the actual values of the thread tension force. Only one regulating circuit is required with this embodiment, namely the thread tension force regulating circuit.

According to another aspect of the invention, an apparatus is provided for tensioning a traveling thread for a textile machine with a comb tensioner having stationary thread guide elements and displaceable thread guide elements operated by an electric drive mechanism, the apparatus being characterized by use of an electrodynamic drive mechanism having a current-force-proportional characteristic curve for moving the displaceable thread guide elements. A thread tension force regulating device is provided for changing the amount of current supplied to the drive mechanism for regulating a thread tension force existing downstream of the comb tensioner to a set value. The thread tension force regulating device includes means for detecting actual values of the thread tension force as a function of reactive forces of the displaceable thread guide element of the comb tensioner acting on the drive mechanism, means for comparing the actual values with the set values for the thread tension force, and means for forming adjusting signals changing the amount of current supplied to the drive mechanism. Such an apparatus has the advantage that a module is created which performs the function of a tensioner as well as the function of a thread tension force sensor.

Further characteristics and advantages will be apparent from the following description of the exemplary embodiments represented in the drawings and the claims.

DETAILED DESCRIPTION OF THE PREFERRED EMBODIMENTS

Figure 1:
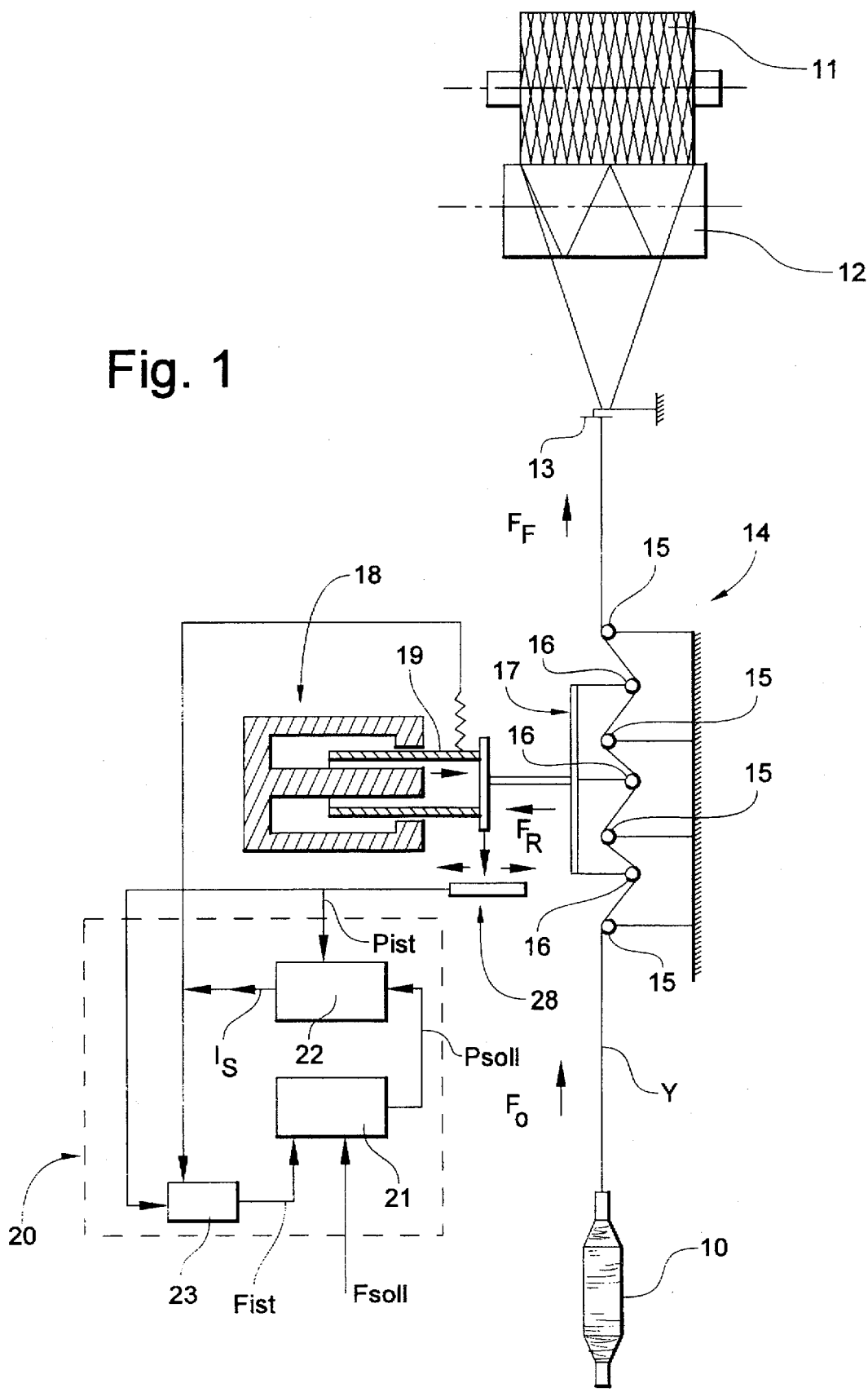
FIG. 1 schematic depiction of an exemplary winding head of automatic winding frame equipped according to the present invention with a modular comb tensioner for performing the functions both of a tensioning device and a thread tension force sensor, and including a first embodiment of a thread tension force regulating device.

Referring now to the accompanying drawings and initially to FIG. 1, a winding head of an automatic winding frame is shown schematically with a thread y being drawn off a spinning bobbin 10 and being wound onto a cylindrical or conical cheese 11. In the exemplary embodiment as shown, the cheese 11 is driven by means of a helically grooved roller 12 with the thread y traveling through a thread guide 13 in advance of the grooved roller 12. The thread length wound on the cheese 11 corresponds to the length of threads from several spinning bobbins 10. For such reason, the winding head is equipped with a means including a splicing device for the automatic connection of the leading end of thread from a fresh spinning bobbin 10 with the trailing end of the wound thread y from a previous bobbin. Furthermore, the winding head has means (not shown) for checking the traveling thread y for flaws. The winding process is interrupted when a flaw is detected, the flawed section is cut out and the thread ends created are connected with each other by means of the splicing device. These means are known to be customarily provided in the winding stations of conventional winding frames and therefore have not been represented in the drawings, since they are not subjects of the present invention.

In order to wind the thread y with a thread tension as uniform as possible to a predetermined thread tension force $F_F$, a comb tensioner 14 is disposed in the path of the thread traveling between the bobbin 10 and the cheese 11 to increase the thread tension force $F_O$ with which the thread y is drawn off the spinning bobbin by a multiplication factor to achieve the desired thread tension force $F_F$ downstream of the comb tensioner 14. The multiplication factor is a function of the structural design of the comb tensioner 14, i.e., of the number and arrangement of thread deflecting elements 15,16 as well as the coefficients of friction existing between the thread deflection elements 15,16 and the thread y. The basics for calculating the multiplication factor are known from the reference TEXTILINDUSTRIE 1968/1969, mentioned above, so that it is possible to calculate the multiplication factor as a function of the relative positions of the thread guides for any type of comb tensioner.

In the exemplary embodiment shown in FIG. 1, the illustrated comb tensioner 14 has four stationary, finger-like thread guide elements 15 and three finger-like displaceable thread guide elements 16 which deflect the thread y respectively between the stationary thread guide elements 15. In the exemplary embodiment, the thread guide elements 15,16 are structurally alike one another and are arranged at the same distance from each other in the traveling direction of the thread. The displaceable thread guide elements 16 are supported on a common holder 17 and are displaceable transversely in respect to the traveling direction of the thread y. Thus, the multiplication factor can be calculated as a direct function of the distance by which the displaceable thread guide elements 16 deflect the thread y between the stationary thread guide elements 15.

It is of course also possible to use structurally differently designed comb tensioners for the present invention wherein, for example, the stationary and/or the displaceable thread guide elements are different or arranged at uneven distances and/or wherein the displaceable thread guide elements are not displaced linearly, but on a curved path or the like. The mathematical relationships for such comb tensioners are also known from the reference TEXTILINDUSTRIE 1968/1969, so that such comb tensioners can also be employed in connection with the invention.

An electrodynamic drive mechanism with a force-current-proportional characteristic curve (i.e., the exerted force is proportional to the incoming electrical current) is provided for displacing the displaceable thread guide elements. In the illustrated embodiment, this electrodynamic drive mechanism is a moving coil and solenoid arrangement 18, but it will be recognized that other electrodynamic drive mechanisms can also be employed, for example, a brushless DC motor may be employed. Such a DC motor is particularly advantageous when the displaceable thread guide elements are displaced in relation to the stationary thread guide elements by means of a rotary drive mechanism or a pivot drive mechanism.

The coil and solenoid arrangement 18 extends the moving coil 19 with an adjusting force $F_S$ which is a function of the current supply to the moving coil 19. The movable thread guide elements 16 are moved by means of this adjusting force $F_S$ into the thread path between the stationary thread guide elements 15 until an equilibrium between the adjusting force $F_S$ and the opposing reactive force $F_R$ has been achieved. The reactive force $F_R$ has a known mathematical relationship with the thread tension force $F_F$ (and also with the thread tension force $F_O$, taking the relative positions of the thread guide elements 15,16 in respect to the angle of wrap of the thread y and thread guide elements 15,16 into consideration, as is known from the reference TEXTILINDUSTRIE 1968/1969. By changing the amount of current supplied to the moving coil 19, it is thus possible to change the adjusting force $F_S$ and along with this the reactive force $F_R$ as well as the thread tension force $F_F$ in the direction of the thread travel path downstream of the comb tensioner 14. As explained in more detail below, these connections are employed for adjusting the thread tension force $F_{soll}$ to a predetermined set value $F_{soll}$.

To adjust the thread tension force $F_F$ to a set value $F_{soll}$, the actual value of the thread tension force $F_F$ is registered and compared with the set value $F_{soll}$. A control signal is formed in case of deviations, which appropriately changes the amount of current, used as an adjustment value, supplied to the moving coil 19.

A thread tension force regulating device 20 is provided in the exemplary embodiment of FIG. 1, which contains a thread tension force regulating circuit 21 and a position regulating circuit 22. Following a comparison of the actual value $F_{ist}$ Of the thread tension force $F_{soll}$, the determination of which is explained below, and the set value Fsoll of the thread tension force $F_F$, the thread tension force regulating circuit 21 forms an adjustment value which is input as the set position signal $P_{soll}$ into the position regulating circuit 22.

A position sensor 28 is connected with the position regulating circuit 22, which detects the actual position $P_{ist}$ of the holder 17 of the thread guide elements 16 and reports such detected position to the position regulating circuit 22. The position regulating circuit 22 forms a signal $I_S$ as the adjustment value for the amount of current supplied to the moving coil 19. The signal $I_S$ is passed on to an adjustment member (not shown) which supplies an amount of current, to the moving coil 19) which corresponds to the signal $I_S$.

If a change in the thread tension force $F_F$ occurs, i.e., in case of a deviation from the set value $F_{soll}$, the position regulating circuit 22 initially reacts by changing the current supply signal $I_S$ in order to maintain the set position.

Based on the relationship between the adjusting force $F_S$ and the thread tension force $F_F$, the current supply signal $I_S$ is representative of the actual value $F_{ist}$ Of the thread tension force $F_F$. This current supply signal $I_S$ is therefore used for forming the actual value $F_{ist}$ of the thread tension force $F_F$ in an evaluating device 23. Based on the position signal from the position sensor 28 and the signal $I_S$, the evaluating device 23 forms a signal which is representative of the respective actual value $F_{ist}$ of the thread tension force $F_F$. This can take place by means of a computer on the basis of the mathematical relationships in the reference mentioned above, or by access to stored look-up tables. In this case, it is possible to take process parameters which affect the coefficient of friction of the yarn, such as yarn speed, type of yarn or yarn finish, into consideration. The deviations between the actual value $F_{ist}$ of the thread tension force $F_F$ and the predetermined value $F_{ist}$ are compared in the thread tension force regulating circuit 21 and are evaluated by means of a computer or stored tables in order to form a changed signal $P_{soll}$ for the set position by which the thread tension force $F_F$ again approaches the set value $F_{soll}$. To this end, the position regulating circuit 22 issues an appropriate adjusting signal $I_S$ for supplying the moving coil 19 with current, which corresponds to the required adjusting force $F_S$.

Thus it becomes clear from the above that the comb tensioner 14 with its moving coil-solenoid arrangement 18, or such other suitable electrodynamic drive mechanism with a force-current-proportional characteristic curve, performs an alternating tensioning function and a function as a thread tension force sensor. This alternating dual function is controlled by a clock generator (not shown) of the thread tension force regulating device 20.

Figure 2:
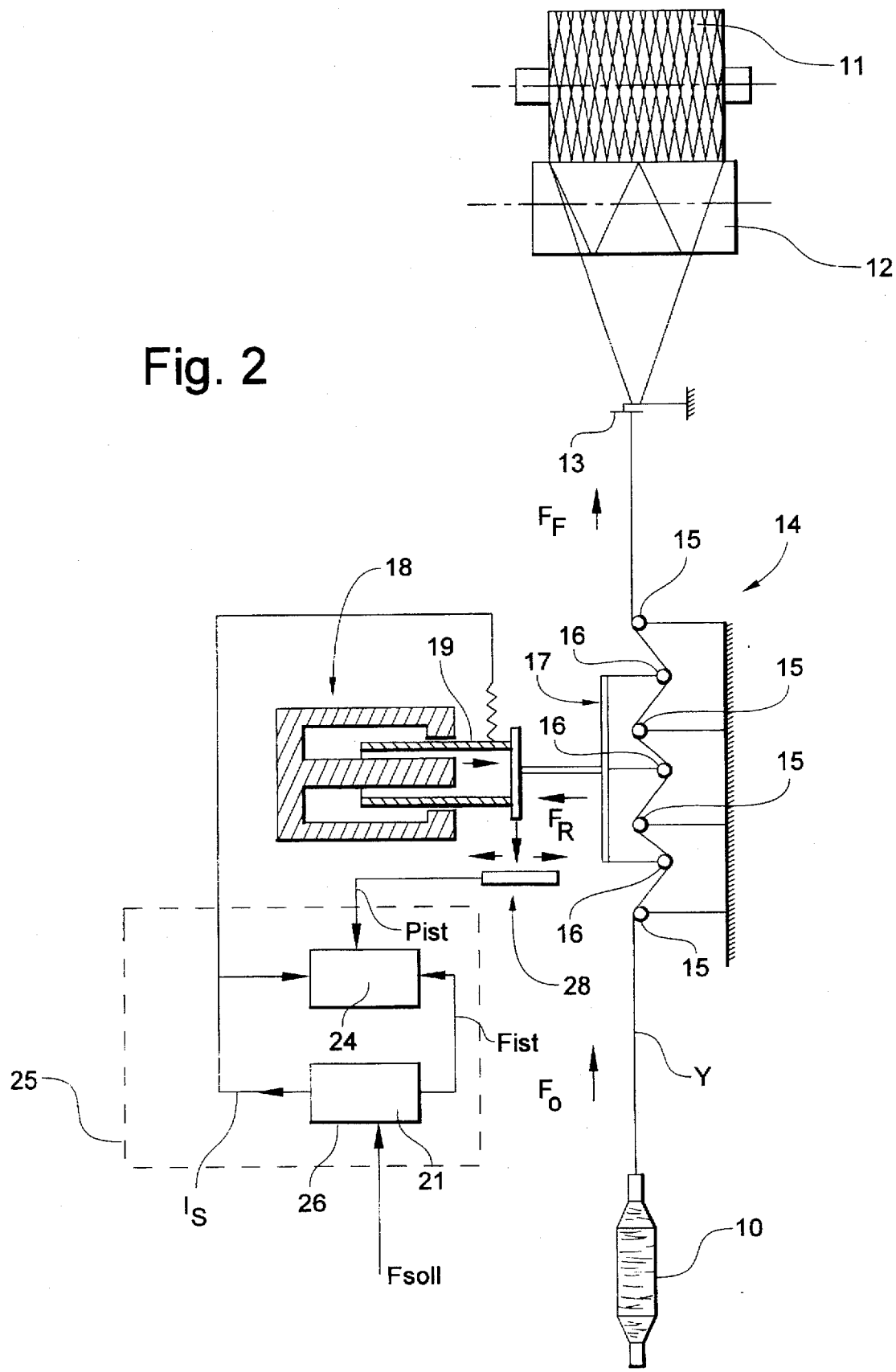
FIG. 2 is another schematic depiction of an exemplary winding head of an automatic winding frame similar to FIG. 1, with an alternative embodiment of thread tension force regulating device.

In respect to the mechanical parts of the invention, the alternate exemplary embodiment of FIG. 2 corresponds to the exemplary embodiment of FIG. 1, i.e., in respect to the comb tensioner 14, in respect to the drive mechanism by means of a moving coil-solenoid arrangement 18 for the displaceable thread guide elements 16, and in respect to the position sensor 28. However, the apparatus of FIG. 2 has a modified thread tension force regulating device 25. This thread tension force regulating device 25 contains a thread tension force regulating circuit 26, which performs a comparison of the set value $F_{soll}$ of the thread tension force $F_F$ and the actual tension value $F_{ist}$ and directly issues a current supply signal $I_S$ for the amount of current supplied to the moving coil 19. When the thread tension force $F_O$ and the thread tension force $F_F$ lie in the range suitable for regulation, the moving coil 19, along with the displaceable thread guide elements 16 carried by the holder 17, moves into a position in which the adjusting force $F_S$ and the reactive force $F_R$ cancel each other. The thread tension force $F_O$ existing at such moment is increased by the multiplication factor defined by the position taken by the displaceable thread guide elements 16.

The resulting position of the holder 17 for the thread guide elements 16 is registered by the position sensor 28 and, together with the current supply signal $I_S$, is entered into an evaluation device 24. This evaluating device 24 evaluates the position signal, which has a mathematical relationship with the thread tension force $F_F$, while taking the current supply signal into consideration, and forms a signal from them which corresponds to the actual value $F_{ist}$ Of the thread tension force $F_F$. Then the actual value $F_{ist}$ and the preset set value $F_{soll}$ of the thread tension force $F_F$ are compared in the thread tension force regulating circuit 26. In case of deviations, a modified current supply signal $I_S$ is formed as an adjusting signal or adjusting value, by means of which the position of the displaceable thread guide elements 16 is changed in such a way that the thread tension force $F_F$ downstream of the comb tensioner 14 again assumes the set value $F_{soll}$.

Figure 3:
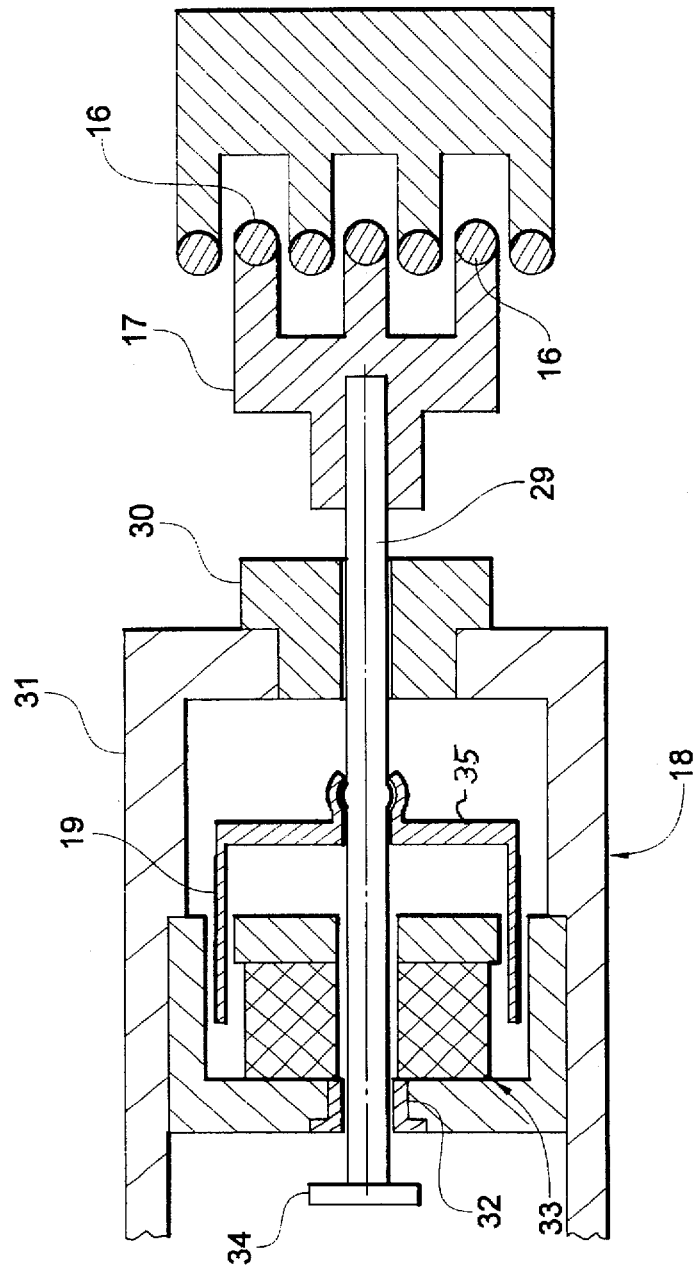
FIG. 3 is an enlarged cross-sectional view of a comb tensioner with an electrodynamic drive mechanism according to the present invention.

The moving coil-solenoid arrangement 18, by means of which the holder 17 with the displaceable finger-like thread guide elements 16 can be displaced, is shown in enlarged form in FIG. 3. The holder 17 is connected with a rod 29 oriented transversely to the traveling direction of the thread and seated to be axially displaceable in a bearing bush 30 of a housing 31 and in a bearing 32 of a solenoid 33. To minimize the bearing forces, which distort the thread tension force measurement, the bearing can also be embodied hydrostatically, as a magnetic bearing or with air bearings. Seating in diaphragms is also possible, wherein the restoring force of these diaphragms can be taken into consideration in the evaluation. A coil support 35 is fastened on the rod 29, which is seated to be axially displaceable, but secure against relative rotation, and the moving coil 19 is affixed on the coil support 35. On its end facing away from the displaceable thread guide elements 16, the rod 29 is provided with a reflecting plate 34 which, together with a reflecting photoelectric barrier (not shown, constitutes a position sensor 28 for indicating the position of the holder 17 and the thread guide elements 16. In a preferred embodiment, this position sensor 28 has a linear relationship between the path signal and the path. It is also possible in connection with such position sensors to employ forked photoelectric barriers or differential transformers.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A process for tensioning a traveling thread y in a textile machine by means of a comb tensioner having thread guide elements which are stationary and thread guide elements which are displaceable in a defined manner in respect to the stationary guide elements, the process comprising the steps of moving the displaceable thread guide elements into tensioning contact with the traveling thread by means of an electrodynamic drive mechanism which exerts a force proportional to electrical current input thereto, delivering a current supply to the electrodynamic drive mechanism in order to achieve a thread tension force existing downstream of the comb tensioner of a set value, determining an actual value of the thread tension force as a function of reactive forces of the displaceable thread guide elements of the comb tensioner acting on the electrodynamic drive mechanism and as a function of the position of the displaceable thread guide elements of the comb tensioner, comparing the actual value of the thread tension force with the set value of the thread tension force, and, in case of deviations between the actual value and the set value of the thread tension force, issuing adjusting signals to change the amount of current supplied to the drive mechanism.

2. The process in accordance with claim 1, and further comprising the steps of providing a thread tension force regulating circuit for combining predetermining a position set value with said thread tension force actual value for the displaceable thread guide elements, providing a position regulating circuit for issuing adjusting signals for changing the amount of current supplied to the drive mechanism, said position regulating circuit being in communication with the thread tension force regulating circuit for maintaining the displaceable thread guide elements at the position set value predetermined by the thread tension force regulating circuit, and producing said actual value of the thread tension force from the signals of the position regulating circuit.

3. The process in accordance with claim 1, and further comprising the steps of evaluating adjusting signals representing the amount of current supplied to the electrodynamic drive mechanism and the signal representing the position of the displaceable thread guide element of the comb tensioner to form the actual value of the thread tension force.

4. Apparatus for tensioning a traveling thread y in a textile machine comprising a comb tensioner having stationary thread guide elements and displaceable thread guide elements, an electrodynamic drive mechanism which exerts a force proportional to electrical current input thereto for moving the displaceable thread guide elements, and a thread tension force regulating device for changing the amount of current supplied to the drive mechanism for regulating a thread tension force existing downstream of the comb tensioner to a set value, the thread tension force regulating device comprising means for detecting a actual value of the thread tension force as a function of reactive forces of the displaceable thread guide elements of the comb tensioner acting on the drive mechanism, means for comparing the actual value with the set value of the thread tension force, and means for forming adjusting signals for changing the amount of current supplied to the drive mechanism.

5. Apparatus in accordance with claim 4, wherein said thread tension force regulating device includes a position regulating circuit for maintaining the displaceable thread guide elements in a set position and forming the adjusting signals which determine the amount of current supplied to the drive mechanism, a thread tension force regulating circuit in communication with said position regulating circuit for inputting the set positions thereto, and means for forming signals which represent the actual value of the thread tension force based upon the adjusting signals of the position regulating circuit.

6. Apparatus in accordance with claim 4, wherein said thread tension force regulating device includes a device for forming signals which represent the actual value of the thread tension force based upon the position of the displaceable thread guide elements of the comb tensioner and the amount of current supplied, and a thread tension force regulating circuit connected to said device for forming the adjusting signals for supplying current to the drive mechanism.

* * * * *